United States Patent Office 3,520,765
Patented July 14, 1970

3,520,765
MOISTURE PERMEABLE COMPOSITE SHEET MATERIAL AND PROCESS FOR PREPARING SAME
Alva W. Bateman, Hendersonville, Tenn., assignor to E. I. du Pont de Nemours and Company, Wilmington, Del., a corporation of Delaware
No Drawing. Continuation-in-part of abandoned application Ser. No. 355,436, Mar. 27, 1964. This application Apr. 28, 1967, Ser. No. 634,465
Int. Cl. B32b 5/28, 5/02
U.S. Cl. 161—84
15 Claims

ABSTRACT OF THE DISCLOSURE

A moisture-permeable sheet material is provided which is useful as a shoe-upper material, has good surface smoothness, and is very resistant to damage when subjected to high-tension lasting operations during shoe manufacture; said sheet material is made up of a porous substrate fabric (e.g., a nonwoven fabric), and in superposed adherence therewith, a woven fabric made from a blend of synthetic fibers and cotton fibers and having a very specific combination of properties, and a mass of microporous moisture-permeable flexible polymeric composition which forms a smooth coating on the upper surface of the product and penetrates the pores of both fabrics whereby the coating and fabrics are integrally bonded together.

CROSS-REFERENCE TO RELATED APPLICATION

This is a continuation-in-part of my patent application Ser. No. 355,436, filed Mar. 27, 1964 and now abandoned.

BACKGROUND OF THE INVENTION

This invention relates to moisture-permeable composite leather-like sheet materials useful as shoe-upper materials and to a process for preparing such sheet materials.

It is well-known in the art that leather-like sheet materials useful as shoe-upper materials can be prepared by impregnating and coating fibrous web substrates with certain polymeric materials.

One of the problems which shoe manufacturers have encountered during the lasting operations when making shoes from previously-known man-made shoe-upper materials is the development of surface roughness in those areas which require stretching of the material over a last (e.g., in the toe and quarter areas of the shoe). Even when a carefully prepared nonwoven web is used as the substrate, this roughening problem is usually encountered. The roughening pattern seems to be associated with a pattern which is present in the structure of most fibrous substrates prior to application of the polymeric coating.

There has been a longstanding need for a man-made shoe-upper material having good surface smoothness not only in the as-produced relaxed state but also when under the tension commonly used in the stretching and lasting operations. A material which does not develop noticeable roughness during lasting is sometimes referred to in the art as a nonroughening material. There has been a particular need for a nonroughening shoe-upper material which is highly resistant to rupture or other damage to the structure during relatively high tension lasting operations, as well as being adapted in other important respects for the manufacture of good quality shoes (e.g., having satisfactory flexibility, moisture permeability, durability and resistance to undue stretching).

Moisture-permeable microporous man-made leather-like sheet materials are sometimes referred to in the art as poromeric materials.

SUMMARY OF THE INVENTION

In a broad sense, the novel product of this invention (sometimes referred to herein simply as "the sheet material") is a moisture-permeable composite sheet material having:

good surface smoothness when relaxed and when under tension,
utility as a breathable shoe-upper material, and
good resistance to damage when subjected to relatively high tension lasting operations during shoe manufacture, said sheet material containing as essential components
 (A) a porous substrate fabric,
 (B) a porous woven fabric of a blend of synthetic fibers and cotton fibers in superposed adherence with fabric (A), and having (1) a tensile strength of at least about 55 pounds per inch in both the warp and fill directions, (2) a break elongation of about 20–30% in both the warp and fill directions, (3) a modulus at 5% elongation of about 2000–4000 p.s.i. in the warp direction and about 1800–3800 p.s.i. in the fill direction, (4) a thickness of about 5–6 mils, and (5) a smoothness factor of less than about 20 mils, and
 (C) a mass of microporous moisture-permeable flexible polymeric composition which forms a smooth coating in superposed adherence with fabric (B), penetrates the pores of fabric (B), penetrates the pores of at least the uppermost portion of fabric (A), and integrally bonds the coating and the fabrics together.

DESCRIPTION OF PREFERRED EMBODIMENTS

It is often advisable to use a nonwoven fabric as fabric (A); however, any suitable woven fabric can also be used, for example one which has been subjected to a napping operation which produces a suede-like nap on one or both surfaces. An especially preferred nonwoven fabric is one which has the structure resulting from having been impregnated throughout its thickness with a moisture-permeable flexible polymeric composition. Such a nonwoven fabric can be prepared for example by the procedure described in Example 1 of U.S. Pat. 3,067,483 issued Dec. 11, 1962 to J. L. Hollowell.

Fabric (B) must be a woven fabric, and it must be made from a blend of synthetic fibers and cotton fibers. The synthetic fibers are preferably polyester fibers (e.g., polyethylene terephthalate); and the weight ratio of polyester fibers to cotton fibers in the fabric is preferably about 50/50 to 75/25, still more preferably about 65/35. Other synthetic fibers (e.g., acrylic fibers, olefin fibers or nylon fibers) which are capable of being combined with cotton fibers and made into a fabric having the properties specified above can also be used. One skilled in the art, in the light of the present disclosure, will have little difficulty in selecting the proportion and type of synthetic fiber that gives the best combination of smoothness, interlayer adhesion and resistance to damage of the sheet material during stretching and lasting operations.

Fabric (B) has a smoothness factor of up to about 20 mils, and in some of the best embodiments of the invention the fabric has a smoothness factor of about 12–18 mils. The smoothness factor refers to the thickness in mils of the coating of polymeric composition after coagulation and drying which hides the surface pattern of fabric (B) so that the pattern of the fabric is rendered substantially invisible to the unaided eye.

Best results are usually obtained when fabric (B) has a substantially square weave; also when it is a fabric which has been bleached, desized, and singed on both sides. Especially beneficial results are obtainable when fabric (B) is a fabric which has been stretched in width while wet (e.g., saturated with water) about 2–10% of its greige width and then dried while maintained in the stretched condition. This stretching operation is preferably done before the fabric is combined with the mass of microporous composition referred to above as component (C). The stretched and dried fabric does not have to be kept in a dry condition before it is combined with component (C); in fact, a wetting liquid (e.g., water) can be applied to it prior to or during the formation of the sheet material in an amount equal to about 1–50% based on the combined weight of fabric and wetting liquid. The thickness of fabric (B) can be slightly outside the range of 5–6 mils, and the tensile strength can be slightly less than 55 pounds per inch in at least one direction, without departing from the spirit of this invention and while achieving the beneficial results of a nonroughening product combined with resistance to damage during high tension lasting operations. It is usually advisable however to use a fabric having a tensile strength of about 55–68 pounds per inch in both the warp and fill directions.

The properties specified above as essential for the fabric (B) component are the properties of the fabric before being combined with the other components of the sheet material; it will be understood that at least one of these properties might undergo enough change during the various operations employed in preparing the finished product (e.g., bathing, drying, shrinking, stretching, embossing etc.) so that the property of the fabric within the final product is slightly outside the range specified.

With reference to component (C) of the sheet material, the polymeric coating on fabric (B), which forms the upper surface of the product, generally has a roughness value of about 0–1 and a thickness of not more than about 30 mils, preferably about 12–20 mils. Roughness values of poromeric materials are determined by Machine Model 1004–50B made by Columbia Vise and Manufacturing Company, Cleveland, Ohio. Using this machine, the roughness value of a poromeric material is determined by clamping a twelve inch square sample tightly between ring clamps, coating side up, and distending the material upwards by a plano-convex deformation head to a maximum of one inch above the original plane. The head is moved by hydraulic pressure over a period of about 15 seconds. If there is no apparent roughness at the high point the roughness value is zero; if discernible but insignificant roughness is present the roughness value is one; if more than insignificant roughness is apparent to the naked eye, the roughness value is greater than one and the material does not have a sufficiently smooth appearance for most shoe-upper applications.

The polymeric material of component (C) preferably has a secant tensile modulus at 5% elongation of over 600 p.s.i., still more preferably about 800–3,000 p.s.i. The secant tensile modulus is the ratio of the stress to the strain at 5% elongation of the polymer sample determined from the tensile stress-strain curve, and is expressed as force per unit area, e.g., pounds per square inch (often expressed as p.s.i.). The secant tensile modulus measurement is carried out according to ASTM D–882–64–T, modified as described below.

The secant tensile modulus of the polymer is determined by forming a 5 to 20 mil thick continuous void-free polymer film from a polymeric solution, for example, the solution to be used to form the microporous polymeric layer of the sheet material of this invention. The film is formed by casting the polymeric solution on a glass plate and the solution is then dried, e.g., at 105° C. for 90 minutes.

The stress-strain curve which is necessary to calculate the secant tensile modulus of the polymer is preferably obtained on an Instron Tensile Tester, using a ½ inch wide specimen cut from the void-free polymeric film, with about one inch between grips. The following settings are preferably used on the Instron Tester to obtain a stress-strain curve: chart speed of 10 inches per minute, crosshead speed of 1 inch per minute, and a full scale load of 2 to 5 pounds.

The secant tensile modulus is obtained from the chart of the force vs. strain curve by drawing a line at 5% specimen elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

A preferred polymeric material for component (C) of the sheet material is one having a polyurethane elastomer content of at least 51% by weight and a vinyl chloride polymer (e.g., polyvinyl chloride) content of up to 49% by weight. Pigments and others additives can be added if desired.

The present invention also provides a process for preparing a moisture-permeable composite sheet material which comprises:

(a) providing a porous substrate fabric, (b) providing a porous woven fabric of a blend of synthethic fibers and cotton fibers, said woven fabric having been stretched while wet at least 2% in width and then dried while in the stretched condition, said woven fabric also having the tensile strength, break elongation, modulus, thickness, and smoothness factor specified above in the broad description of the novel sheet material, (c) providing a liquid polymeric composition which is comprised of a polymer dispersed in a liquid comprising an organic solvent, and which is capable of being solidified in situ to form a microporous structure when bathed and dried according to steps (e) and (f) below, (d) forming a composite assembly from the components provided in steps (a), (b) and (c) so that said woven fabric is in superposed relation with said substrate fabric, and so that there is a continuous body of said liquid polymeric composition which not only forms a coating on the top surface of said woven fabric but also penetrates the pores of said woven fabric and the pores of at least the uppermost portion of said substrate fabric, said coating being of sufficient thickness so that after step (f) its thickness is less than 30 mils but great enough to render the surface pattern of said woven fabric substantially invisible to the naked eye, (e) bathing the liquid polymeric composition of said composite assembly with a liquid coagulant adapted to extract the organic solvent from said composition until substantially all of said solvent is extracted, and (f) drying the composite assembly;

steps (e) and (f) causing said composition to solidify in situ and become a microporous moisture-permeable structure which forms an adherent smooth coating on the top surface of the resulting moisture-permeable composite article and which bonds said fabrics together.

Just before the bathing operation specified in step (e), the assembly can be exposed to a humid air zone having a suitable relative humidity (e.g., 40%) and temperature (e.g., 26° C.) until the coating on the woven fabric has absorbed enough water to cause at least the uppermost portion of the layer to coagulate. At least the last portion of the bathing operation preferably employs a bathing liquid which can easily be removed from the sheet material by evaporation in a heat zone.

In a preferred embodiment of the process described above, step (d) is carried out by placing said woven fabric in superposed contact with said said substrate fabric to form a composite fabric, applying a layer of said liquid polymeric composition on the top surface of the composite fabric, and allowing the lower portion of the layer of liquid polymeric composition to flow downward at a pressure not substantially above atmospheric pressure until it penetrates the pores of the woven fabric and the pores of at least the uppermost portion of the substrate fabric as well as any voids between the two fabrics.

One very useful type of liquid polymeric composition to use in step (c) of the process is a substantially colloidal polymeric dispersion which has been prepared by adding a non-solvent to a polymer solution according to the method described in claim 1 of U.S. Pat. 3,100,721 issued Aug. 13, 1963 to E. K. Holden, U.S. Pat. 3,208,875 issued Sept. 28, 1965 to E. K. Holden (e.g., in Example 1) also describes useful liquid polymeric compositions, as well as a useful procedure for causing the composition to solidify in situ to become a microporous moisture permeable structure. The disclosures of both of these patents are incorporated herein by reference.

The process of the present invention and the product produced can be illustrated by a preferred embodiment wherein the impregnated nonwoven web of Example 1 of U.S. 3,100,721 is placed beneath and in close contact with a woven interlayer fabric composed of yarns of mixed polyester fibers and cotton fibers in the ratio of 65:35. This fabric, which is commonly used in men's shirting, is desired and stretched, while wet, at least 2% in width prior to use herein and dried to a moisture content of less than 3% by weight while in the stretched condition. The fabric is also bleached and double singed on each side when the highest quality products are desired or when the product is to be dyed.

The polymeric dispersion utilized in Example 1 of U.S. 3,100,721 is then coated on the upper surface of the interlayer fabric in an amount sufficient to provide a uniform smooth coating over the surface. The polymeric dispersion has a viscosity low enough to permit it to penetrate the interlayer fabric and to enter at least a portion of the substrate fabric. The quantity of polymeric dispersion applied to the interlayer is large enough so that even after such penetration and filling of the interstices of the interlayer fabric and those of the substrate fabric, there still remains a coating on the upper surface of the interlayer fabric of sufficient thickness so that after coagulation of the polymer therein there is a surface coating of polymeric material at least 12 mils thick. If the viscosity of the polymeric dispersion is low enough, it will penetrate the interlayer and substrate merely by force of gravity and without assistance. Where higher viscosities are utilized, suction may be applied to the under side of the substrate, or to the under side of the interlayer before the interlayer is contacted with the substrate; or the polymeric dispersion may be forced into the interstices of the interlayer and substrate fabrics by any other convenient means. The manner of causing penetration of the interlayer and the substrate fabric by the polymer dispersion is not critical, but it has been found that the application of suction beneath the substrate or the interlayer serves to provide more uniform penetration with least disturbance of interlayer characteristics, and produces poromeric materials having the best combination of nonroughening properties and delamination resistance. The coated structure is bathed and dried as described above. Products thus produced have a smooth coating of microporous polymeric material over the surface of the interlayer, and this coating is contiguous with a matrix of the polymeric dispersion extending within and connecting the interstices of the interlayer fabric and the substrate, thereby providing a sturdy bond between the polymeric coating and the substrate.

The resulting sheet material is usually subjected to finishing operations known to be useful on man-made leatherlike products, for example dyeing to the desired color, primer coating, coating with a clear topcoat composition, and finally embossing to provide the surface with the desired sheen and/or grain pattern.

Leather-like shoe-upper materials are obtainable in accordance with the present invention which have a surprisingly beneficial combination of properties including (1) a high level or surface smoothness both when relaxed and when subjected to high tension lasting operations [e.g., as commonly employed in the manufacture of men's dress shoes], (2) excellent resistance to rupture or other damage to the sheet structure during high tension lasting operation, and (3) suitable flexibility, moisture-permeability, wear resistance, delamination resistance, and resistance to undue stretching during shoe manufacturing opeations as well as during use of the shoe. It is quite unexpected to obtain all of these desirable properties in a single man-made shoe-upper material.

The sheet material of this invention usually has a bond strength (delamination resistance) of about 3 pounds per inch or more between coating and interlayer fabric and between interlayer fabric and substrate fabric. Also, the product usually has a permeability value of about 3000 or more, as determined by the test described by Kanagy and Vickers in the Journal of American Leather Chemists Association, 45, 211–242 (Apr. 19, 1950). The strength of the adhesive bond between the interlayer and substrate is determined by taking a 1" x 6" sample and cutting it across the width sufficiently deep so that the interlayer can be separated from the substrate for a length of about 2 inches. The sample is then placed in an Instron tensile strength tester and the tensile strength of the adhesive bond measured using a crosshead speed of 10 inches per minute, a chart speed of 2 inches per minute and a jaw gap of 2 inches. Strength of the adhesive bond between the polymeric coating layer and the interlayer is determined similarly. Both can be referred to as delamination bond strengths.

The examples which follow are given for the purpose of illustrating the invention. All quantities shown are on a weight basis unless otherwise indicated.

EXAMPLE 1

A sheet material having outstanding utility as a breathable shoe-upper material is prepared as follows. A substrate consisting of a porous impregnated needle-punched nonwoven web like that utilized in Example 1 of U.S. 3,100,721 is brought into contact with an interlayer material consisting of a woven fabric composed of yarns made up of a blend of 65% polyethylene terephthalate fibers and 35% cotton fibers, the fabric having a greige count of 96 x 96 (warp x fill). The interlayer fabric is one that has been desized by conventional methods and then stretched while wet from an initial width of 47 inches to a final width of 49 inches, and dried while in the stretched condition, using a conventional tenter frame. By this procedure the fabric, which initially had a tensile strength of 62 x 65 pounds per inch, a modulus of 3400 x 1200 pounds per square inch at 5% elongation and a break elongation of 26% x 35%, was converted to a fabric having a tensile strength of 59 x 62 pounds per inch, a modulus of 3000 x 2600 pounds per square inch at 5% elongation, a break elongation of 25% x 25%, a smoothness factor of 14 mils, a thickness of 5.5 mils and weight of 2.3 ounces per square yard. Thickness is determined by ASTM D–1813–60T.

The nonwoven fibrous substrate is one that had been previously impregnated with a polyurethane dispersion composition corresponding to that utilized below and then dried so that the impregnated substrate contained 50% dispersion solids based on the weight of fibers.

The interlayer fabric is placed on top of the impregnated substrate, and the polymer dispersion in a dimethyl formamide/water mixture, prepared in accordance with Example 1 of U.S. 3,100,721, is coated on the upper surface of the interlayer sheet in the amount of 3.75 pounds dispersion per square yard of surface coated. The coated structure is subjected to suction (5 inches of mercury vacuum) from the under side of the substrate layer for a few seconds, which is sufficient to draw the polymer dispersion through the interlayer material and partially into the substrate layer, forming a continuous matrix connecting the two layers. The amount of suction and the length of time it is applied is regulated so that sufficient polymer dispersion remains on the upper side of the interlayer fabric to provide a coating about 18 mils thick after coagulation and drying. About one-half minute after suction is released, during which time the polymeric dispersion "flows out" and forms a smooth coating on the upper surface of the interlayer material while undergoing a partial coagulation or precipitation reaction as a result of its exposure to the moisture in the atmosphere, the laminated structure is immersed in a tank which contains water at room temperature and is bathed in this water for about 3 minutes. Finally, the product is immersed in another water bath at 35° C. until the polymer is completely coagulated. Residual solvent is leached from the product by further bathing in water, and then the coated substrate is subjected to hot air at 120° C. until dry.

The resulting sheet material, which has an unusually beneficial combination of shoe-making characteristics, has a permeability value of 9000, a very smooth surface, and a high level of rupture resistance. The preparation of the product for use in the manufacture of shoes is completed by:

(1) dyeing the sheet material brown by (a) dipping it in water at 94° C. for 20 seconds, (b) passing it between a pair of nip rolls to reduce the water content to 40%, (c) dipping it for one minute in a brown aqueous dye bath having a pH of 10.2 and a temperature of 94° C., and containing 3% of a brown dye (CI 20110), (d) passing it between a pair of rubber-covered nip rolls under a pressure of 75 pounds per inch (width of the sheet), (e) dipping it for 80 seconds in an aqueous dichromate solution having a temperature of 94° C. and containing 4 grams per liter of sodium dichromate and 2 grams per liter of acetic acid, (f) passing it between a pair of nip rolls under a pressure of 125 pounds per inch, (g) dipping it in water at 94° C. for 4 minutes, (h) passing it between a pair of nip rolls at 125 pounds per inch, and (i) drying the dyed sheet in an oven at 121° C. for 5 minutes;

(2) applying to the top surface of the sheet by means of a sprayer 0.18 ounce per square yard (dry basis) of a brown acrylic emulsion primer coat and drying the primer coat in a heat zone at 140° C.

(3) applying to the primer-coated surface by means of a sprayer 0.15 ounce per square yard (dry basis) of a brown acrylic emulsion base coat and drying the base coat in a heat zone at 140° C.;

(4) applying to the base-coated surface of the sheet 0.05 ounce per square yard (dry basis) of a clear top coat and drying the sheet in a heat zone at 140° C., the top coat composition being at 3.4% solution of a 60:40 blend of plasticizer and cellulose acetate butyrate in a blended volatile organic solvent; and (5) hot-press embossing the sheet by passing it over a roller heated to 160° C. to preheat it and then passing it through an embossing apparatus generally as described as the preferred embodiment of U.S. Pat. 3,157,723 issued Nov. 17, 1964 to J. Hochberg; the surface of the 12 inch diameter roller which contacts the coated surface of the sheet is engraved to provide the surface of the sheet with a fine leather-like grain pattern; the roller has a temperature of 160° C.; each square inch of the sheet is in the nip for a period of 18 seconds (the sheet moves at 3 feet per minute through a nip having a length of 1.5 feet) under a pressure of 13 p.s.i.g. The sheet is then cooled to room temperature, and the bottom surface is buffed on a machine commonly used for raising a nap on fabrics, using an emery cloth covered roll, until a uniform nap is produced.

The coating compositions used in steps 2 and 3 are as follows:

|  | Primer, parts | Base coat, parts |
| --- | --- | --- |
| Total solids content | 24.5 | 20.0 |
| Aqueous dispersion of blended acrylic polymers, 34.5% resin solids (an iminated terpolymer of methyl methacrylate, ethyl acrylate and methacrylic acid) | 34.0 | 45.2 |
| Water | 35.8 | 37.2 |
| Aqueous dispersion of blended pigments to provide brown color | 30.2 | 17.6 |

The product of Example 1 has the following combination of desirable shoe-making characteristics:

extremely smooth appearing surface, both when relaxed and when subjected to the high tension lasting operations commonly employed in the manufacture of men's dress shoes; the product has a roughness value of 0;

excellent resistance to rupture during high tension lasting operations;

relatively economical and easy to manufacture in substantially uniform quality by a continuous mass production method;

good resistance to delamination, the bond strength being 4.5 pounds per inch between the coating and the woven fabric as well as between the two fabric layers;

good wear resistance, breathability and comfort properties when made into men's dress shoes and subjected to normal use;

coating thickness of 18 mils and product thickness of 62 mils; and good resistance to undue stretching during conventional shoe manufacturing operations and during normal use of the resulting shoes.

The product of Example 1 is also useful as a breathable upholstery material, particularly in applications requiring a very smooth or fine-grain finish in combination with high resistance to rupture during fabrication and use of the upholstered product.

Under conditions representative of a typical production run in a shoe factory, 5000 pairs of men's dress shoes (10,000 shoes) are made from the product of Example 1 by a conventional shoe-making procedure wherein the shoe-uppers are subjected to high tension stretching and lasting operations which result in an elongation of the upper material in the toe area of about 9–12% or more. The product of Example 1 is found to have excellent shoe-making characteristics throughout the production run, and all of the shoes are of satisfactory quality. None of the shoes show any signs of rupture or other damage to any portion of the upper material, either before or after the shoes are subjected to normal use.

Example 1A

For purposes of comparison, a shoe-upper material outside the scope of this invention is prepared in the manner described in Example 1 except the woven fabric used in the present example as the interlayer fabric is a cotton lawn fabric which (a) has been made from yarns composed of 100% cotton fibers, the greige fabric having 5.00 x 40 weight (5 yards per pound at 40 inch width), (b) has been desized and then slack mercerized in 23% sodium hydroxide solution to reduce the fabric surface area (one side) 12% below the surface area of the greige fabric, (c) has been bleached and then double singed on both sides, and (d) has a thread count of 123 x 118, a weight of 2.6 ounces per square yard, a tensile strength of 50 x 50 pounds per inch, a break elongation of 15% x 15%, a modulus at 5% elongation of 720 x 1200 p.s.i., a thickness of 5 mils and a smoothness factor of less than 20 mils.

The product of Example 1A is useful for the manufacture of shoes and upholstery, but not nearly as useful as the product of Example 1. An important drawback of the Example 1A product is its limited rupture resistance, which is illustrated as follows.

In the manner described in the latter portion of Example 1, 5,000 pairs of men's dress shoes are made from the product of Example 1A. Many of the resulting shoes are not of satisfactory quality. In fact, 800 of the shoes (8%) had to be destroyed as unsatisfactory for sale because of damage to the upper material (e.g., rupture of the fabric portion of the structure) which occurred mostly in the toe area during the high tension lasting operations. The shoes having the damaged uppers had an ugly groove in the damaged area (e.g., about 1/8" wide and about 1/2–1" long) which rendered them unsatisfactory in appearance. Furthermore, 300 of the shoes (3%) had satisfactory appearance before being worn but developed an ugly crack in the toe area during normal use. Thus, a total of 1100 shoes were rendered unsatisfactory due to damage to the upper material during conventional shoe fabrication operations.

I claim:

1. A moisture-permeable composite sheet material having:
   good surface smoothness when relaxed and when under tension,
   utility as a breathable shoe-upper material, and
   good resistance to damage when subjected to relatively high tension lasting operations during shoe manufacture,
   said sheet material containing as essential components:
   (A) a porous substrate fabric,
   (B) a porous woven fabric of a blend of synthetic fibers and cotton fibers in superposed adherence with fabric (A), and having (1) a tensile strength of at least about 55 pounds per inch in both the warp and fill directions, (2) a break elongation of about 20–30% in both the warp and fill directions, (3) a modulus at 5% elongation of about 2000–4000 p.s.i. in the warp direction and about 1800–3800 p.s.i. in the fill direction, (4) a thickness of about 5–6 mils, and (5) a smoothness factor of less than about 20 mils, and
   (C) a mass of microporous moisture-permeable flexible polymeric composition which forms a smooth coating in superposed adherence with fabric (B), penetrates the pores of fabric (B), penetrates the pores of at least the uppermost portion of fabric (A), and integrally bonds the coating and the fabric together.

2. A sheet material according to claim 1 wherein fabric (A) is a nonwoven fabric.

3. A sheet material according to claim 2 wherein said nonwoven fabric has the structure resulting from having been impregnated throughout its thickness with a moisture-permeable flexible polymeric composition.

4. A sheet material according to claim 1 wherein fabric (B) has a substantially square weave.

5. A sheet material according to claim 1 wherein fabric (B) is a fabric which has been bleached, desized, and singed on both sides.

6. A sheet material according to claim 5 wherein fabric (B) is a fabric which has been stretched in width while wet about 2–10% of its greige width before being combined with said mass of microporous composition.

7. A sheet material according to claim 1 wherein fabric (B) consists essentially of a blend of polyester fibers and cotton fibers.

8. A sheet material according to claim 7 wherein the weight ratio of polyester fibers to cotton fibers in fabric (B) is about 50/50 to 75/25.

9. A sheet material according to claim 8 wherein said weight ratio is about 65/35.

10. A sheet material according to claim 1 wherein fabric (B) has a tensile strength of about 55–68 pounds per inch in both the warp and fill directions.

11. A sheet material according to claim 1 wherein the coating in superposed adherence with fabric (B) has a thickness of less than about 30 mils and a roughness value of about 0–1.

12. A sheet material according to claim 11 wherein said coating has a thickness of about 12–20 mils.

13. A process for preparing a moisture-permeable composite sheet material which comprises:
   (a) providing a porous substrate fabric,
   (b) providing a porous woven fabric of a blend of synthetic fibers and cotton fibers, said woven fabric having been stretched while wet at least 2% in width and then dried while in the stretched condition, said woven fabric also having the tensile strength, break elongation, modulus, thickness, and smoothness factor specified in claim 1,
   (c) providing a liquid polymeric composition which is comprised of a polymer dispersed in a liquid comprising an organic solvent, and which is capable of being solidified in situ to form a microporous structure when bathed and dried according to steps (e) and (f) below,
   (d) forming a composite assembly from the components provided in steps (a), (b) and (c) so that said woven fabric is in superposed relation with said substrate fabric, and so that there is a continuous body of said liquid polymeric composition which not only forms a coating on the top surface of said woven fabric but also penetrates the pores of said woven fabric and the pores of at least the uppermost portion of said substrate fabric, said coating being of sufficient thickness so that after step (f) its thickness is less than 30 mils but great enough to render the surface pattern of said woven fabric substantially invisible to the naked eye,
   (e) bathing the liquid polymeric composition of said composite assembly with a liquid coagulant adapted to extract the organic solvent from said composition until substantially all of said solvent is extracted, and
   (f) drying the composite assembly;
   steps (e) and (f) causing said composition to solidify in situ and become a microporous moisture-permeable structure which forms an adherent smooth coating on the top surface of the resulting moisture-permeable composite article and which bonds said fabrics together.

14. A process according to claim 13 wherein step (d) is carried out by:
   placing said woven fabric in superposed contact with said substrate fabric to form a composite fabric, applying a layer of said liquid polymeric composition on the top surface of the composite fabric, and allowing the lower portion of the layer of liquid polymeric composition to flow downward at a pressure not substantially above atmospheric pressure until it penetrates the pores of the woven fabric and the pores of at least the uppermost portion of the substrate fabric as well as any voids between the two fabrics.

15. A process according to claim 14 wherein said woven fabric consists essentially of a blend of polyester fibers and cotton fibers in a weight ratio of about 50/50 to 75/25.

References Cited

UNITED STATES PATENTS 3,418,198  12/1968  Einstman _____ 161—159

ROBERT F. BURNETT, Primary Examiner

R. L. MAY, Assistant Examiner

U.S. Cl. X.R.

117—161; 156—77; 161—81, 90, 151, 159